March 25, 1969

W. J. ROANTREE 3,434,357

LINEAR POWER AMPLIFIER MECHANISM

Filed Sept. 28, 1967

INVENTOR.
WILLIAM J. ROANTREE
BY
Albert M. Parker
ATTORNEY.

INVENTOR.
WILLIAM J. ROANTREE
BY
Albert M. Parker
ATTORNEY

United States Patent Office 3,434,357
Patented Mar. 25, 1969

3,434,357
LINEAR POWER AMPLIFIER MECHANISM
William J. Roantree, Port Washington, N.Y., assignor to Roantree Electro-Mech Corporation, Port Washington, N.Y., a corporation of New York
Filed Sept. 28, 1967, Ser. No. 671,369
Int. Cl. F16h 21/16
U.S. Cl. 74—25
14 Claims

ABSTRACT OF THE DISCLOSURE

The mechanism incorporates a driven rotatable lead screw along which a carriage travels in either direction in response to a small control force. Rotatably mounted upon the carriage are two sets (each set having one or more rollers) of threaded differential rollers, the threads of which mesh with the thread of the lead screw. Each set of rollers taken with the lead screw constitutes a system for converting rotary to linear motion, the effective linear speed of the system being varied by varying the contact diameters of the screw and roller. The two systems are disposed in opposition, whereby one system tends to drive the carriage in one direction and the other system tends to drive the carriage in the other direction, a control lever on the carriage being connected to both systems so as to vary them inversely. The mechanism amplifies a relatively weak linear command motion by drawing power from a prime power source, and by forcing a load to follow said command motion.

In a first disclosed embodiment a plurality of rollers are employed in each set, the rollers being self-phasing, that is, requiring no means for positively synchronizing them. In a second disclosed embodiment each set of rollers includes a single roller; such device also includes means whereby the rollers are positively held in phase.

BACKGROUND OF THE INVENTION

Field of the invention

The invention relates to a mechanism for variably converting rotary to linear motion in either direction along a lead screw by providing two sets of threaded rollers in meshing engagement with the thread on the lead screw, the rollers being rotatably mounted on a carriage, acting in opposition on the lead screw, and being controlled so that the contact diameters of each roller and screw system vary inversely.

Description of the prior art

McCallum, 2,477,701, shows a construction wherein meshing threads may roll on pitch diameters which are unequal, thus creating a variable speed ratio between the two threaded members. Brinkhurst, 2,556,572, discloses a somewhat similar construction. Both such references show only a single set of meshing screw threads; the devices of the references permit only a limited variation in speed ratio and in only one direction as compared to that of the present invention, and are not so easily controlled as the present device.

SUMMARY OF THE INVENTION

The invention consists in the provision of two sets of threaded rollers mounted on a carriage and meshing with the thread of a lead screw along which the carriage travels. Each roller set and the lead screw constitutes a differential roller-screw system, the two systems being disposed to act in opposition on the screw. The rollers of each set are adjustable so as to vary the contact diameter of each roller-screw system. Means are provided for varying the contact diameters of the systems inversely, whereby to vary the speed of travel of the carriage from zero to a maximum in either direction.

In the first embodiment the unit consists of two sets of four differential rollers; to the right, a small diameter set with contact taking place at the crest of the thread on the rollers and, to the left, a larger diameter set having a contact zone on the flanks of the thread on the rollers. The right-hand set of rollers, if unopposed, would move to the left along the powered lead screw, and, if halted, would exert a predetermined force against the restraining body. On the contrary, the left-hand set of differential rollers, due to its tendency to decrease the contact diameter of the rollers, would move to the right if unopposed and would exert a similar predetermined force if halted. From this it can be seen that the two basic sets are in opposition and that, if properly designed to equalize the above mentioned predetermined force, no translation would occur unless outside forces upset the balance. The rollers of each set are constantly urged toward the lead screw by resilient belts which control the axial force. A rocker arm operated by a control lever is provided to subject one belt to greater tension while decreasing the tension on the other belt, and vice versa.

If the control lever is moved to the right, the rocker arm moves in the direction to increase the belt tension on the left-hand set of differential rollers. This action causes this left-hand set to overpower the opposing right-hand set and cause the entire system to move in a direction corresponding to the movement of the control lever.

The device of the second embodiment has a crest contacting differential roller and a flank contacting differential roller both journalled in a control block. This control block is slidably received within a housing in the form of a slider block, which is guided on the powered lead screw, and allowed to move a small amount vertically in response to the movement of the control lever. The two differential rollers are geared together so that the phase relationship is constant. There is one vertical position of the control block, that shown, where the contact diameters between the lead screw and each differenteial roller are equal, resulting in no linear motion of the device. If the control lever is moved to the left, the control block is moved down and the contact diameters are changed so that both differential rollers are slowed in their rotation relative to the lead screw. The upper differential roller (crest contacting) takes a position relative to the lead screw which corresponds to a decreased driving diameter ($D_L$) and the lower differential roller (flank contacting) takes a position corresponding to an increased driven diameter ($D_R$). The combined effect is that of slowing the differential rollers causing the unit to act in the manner of a right-hand nut and to move the entire assembly to the left in response to the control lever.

BRIEF DESCRIPTION OF THE DRAWINGS

In the drawings, wherein like reference characters refer to like parts throughout the several views.

DESCRIPTION OF THE PREFERRED EMBODIMENTS

Figure 1:
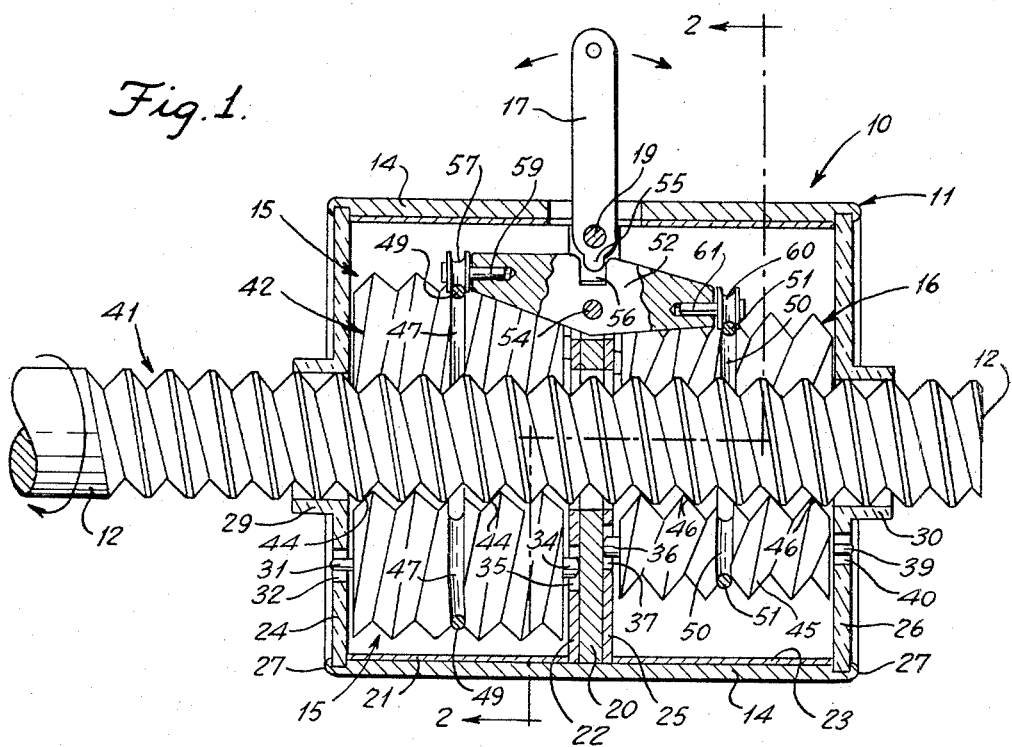
FIG. 1 is a view in longitudinal section through a first illustrative embodiment of the device of the invention, certain of the parts being shown in elevation, the section being taken along the broken section line 1—1 of FIG. 2 looking in the direction of the arrows.
Figure 2:
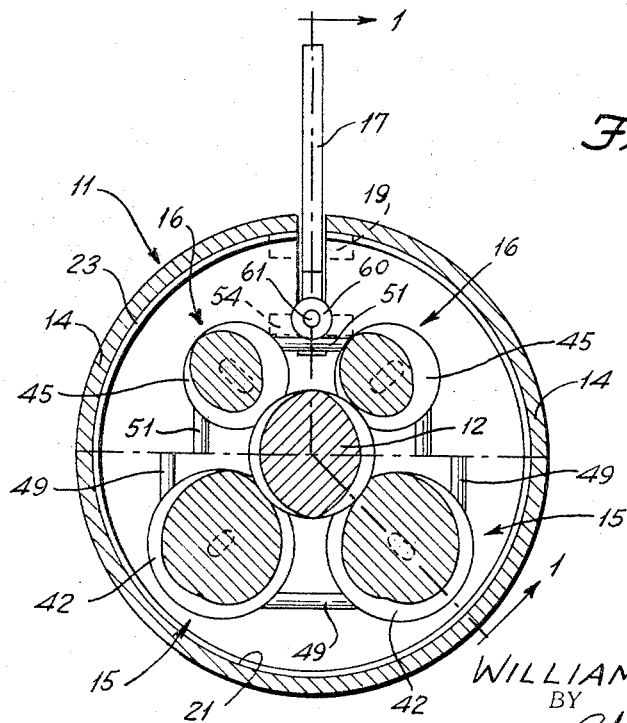
FIG. 2 is a view in transverse section through the device of FIG. 1, the section being taken along the broken section line 2—2 of FIG. 1 looking in the direction of the arrows.
Figure 3:
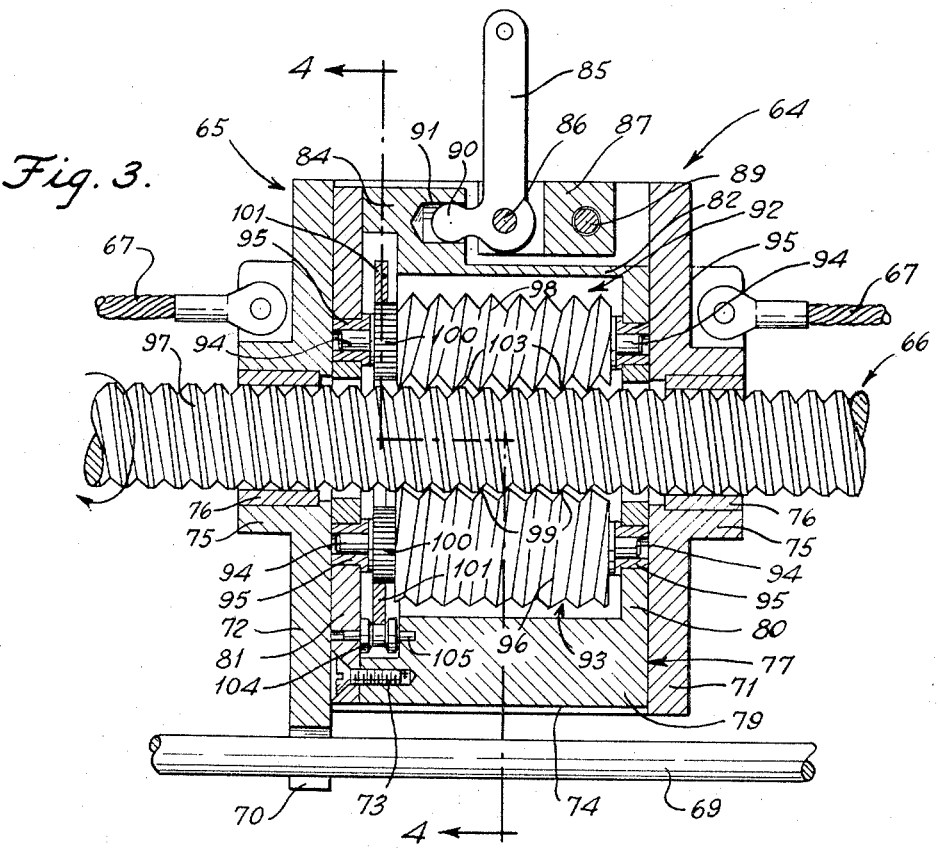
FIG. 3 is a view in longitudinal axial section through a second illustrative embodiment of the device of the invention, certain of the parts being shown in elevation.
Figure 4:
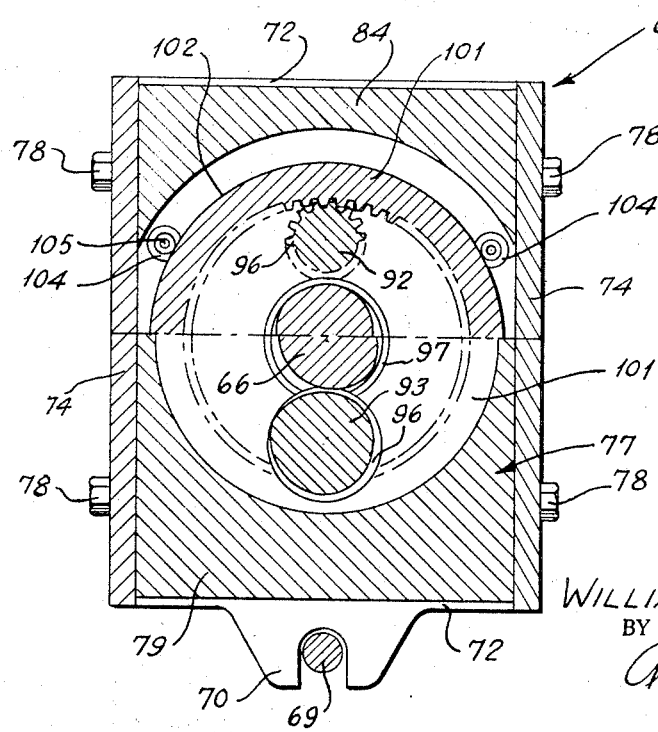
FIG. 4 is a view in transverse section through the device of FIG. 3, the section being taken along the broken section line 4—4 of FIG. 3 looking in the direction of the arrows.

As is apparent from the above, two embodiments of linear power amplifier mechanism in accordance with the invention are shown herein. The first of such embodiments is shown in FIGS. 1 and 2, and the second is shown in FIGS. 3 and 4.

Each of the illustrative mechanisms in accordance with the invention incorporates differential gearing systems which have been generally disclosed and claimed in my prior application Ser. No. 632,769, filed Apr. 21, 1967. The mechanism includes a lead screw having a thread of a constant pitch, the thread being in driving relationship with one or more differential rollers having a thread of generally the same pitch, the differential roller or rollers being mounted upon a carriage mounted for linear travel along the lead screw. The effective lead ($L_e$) is derived from the following equation:

$$L_e = L_L + \frac{D_L}{D_R} L_R$$

where:

$L_L$=lead of the lead screw (positive for right-hand thread)
$L_R$=lead of differential rollers (positive if right-hand thread)
$D_L$=diameter of the driving surface of the lead screw (+ if male thread, − if female thread), and
$D_R$=diameter of the driving surface of the differential roller (+ if male thread, − if female thread).

Variation in the value of $L_e$ may be effected by changing one or both of $D_L$ and $D_R$.

Turning now to FIGS. 1 and 2, the embodiment of mechanism there shown is generally designated by the reference character 10. Such mechanism has a carriage 11 which is mounted upon a continuously rotating powered lead screw 12 and is driven to travel by the screw in either direction or to remain fixed axially with respect thereto by the mechanism to be described. The carriage 11 is adapted to be subjected to an axial load (not shown) as by pushing the load through thrust rods connected to the carriage or by pulling cable means connected to the carriage in the manner to be described in connection with FIGS. 3 and 4. In use, the carriage is held from rotation about the screw 12 by guide means which may be similar to the means 69, 70, to be described in connection with the embodiment of FIGS. 3 and 4. In FIGS. 1 and 2 the parts are shown in the positions which they assume when the screw 12 is rotating, the control lever 17 is in its neutral position, and no axial load is imposed upon the carriage 11.

The carriage 11 has a circular cylindrical housing in the form of a sleeve 14 within which there are journalled generally parallel to the lead screw 12 a plurality (four shown) of first, larger diametered threaded differential rollers 15 at the left-hand end of the housing as it is shown in FIG. 1 and a plurality (four shown) of second, smaller diametered rollers 16 disposed within the right-hand end of the housing. The rollers 15, which are spaced at equal angles about the axis of the screw 12, form a first set of differential rollers; such rollers and the portion of the screw 12 with which they mesh form a system 12, 15 for converting the rotary motion of the lead screw to thrust tending to move the carriage linearly to the right. The rollers 16, which are also spaced at equal angles about the axis of the screw 12, form a second set of differential rollers; such rollers and the portion of the screw 12 with which they mesh form a second system 12, 16 for converting the rotary motion of the lead screw to thrust tending to move the carriage linearly to the left. The two systems are under the control of a common control lever 17, which is pivotally mounted by a pivot pin 19 on a central transverse partition 20 within the carriage. Lever 17 is connected to the two systems so that it varies their driving effects inversely. Thus when the lever 17 is swung clockwise, the system 12, 15 overpowers the system 12, 16, and the carriage 11 moves toward the right. When the lever 17 is swung counterclockwise, the system 12, 16 overpowers the system 12, 15, and the carriage 11 moves to the left. When the differential rollers of the two systems and the lever 17 lie in the positions shown in FIG. 1, the linear traversing effects of the two systems upon the carriage 11 are equal by design, and thus the carriage is at rest.

The partition 20 is retained in its central position within the member 14 by left and right spacer sleeves 21 and 23, respectively, disposed within the member 14 and between end closure member 24 and 26 on the carriage and disc-like plate members 22 and 25 disposed parallel to and abutting the opposite faces of the partition member 20. Members 24 and 26 are tightly held and retained upon the member 14 by inturned annular edge portions 27 on the latter, as shown, all of the members 24, 21, 22, 20, 25, 23, and 26 being under compression at their edges and thus held from rotation with respect to the sleeve 14. If desired, means such as slots in the edges of members 24, 22, 20, 25, and 26 and one or more ribs on sleeve 14 received within such slots may be provided in order positively to key such latter members against rotation with respect to sleeve 14. The end closure members 24 and 26 are provided with axially oppositely extending central bushing portions 29 and 30 which accurately receive the outer edges of the lands of the thread on screw member 12 and thus guides the carriage 11 along the screw.

Each of the rollers 15 is provided with a central stub shaft 31 on its left-hand end, shafts 31 being accurately received within respective radial slots 32 in the end closure plate 24. The right-hand end of each roller 15 is provided with another central stub shaft 34 which is similarly received in the respective parallel sided radial slot 35 in the disc-like plate member 22. Such slots and stub shafts permit the rollers 15 to move radially inwardly and outwardly with respect to the lead screw 12 so as to vary the radius of engagement between the crest of the threads on the lead screw and the flanks of the threads on the differential rollers 15, in a manner to be described. The rollers 16 are similarly guided for movement radially inwardly and outwardly with respect to the axis of the lead screw 12. Thus each of the rollers 16 is provided at its left-hand end with a central stub shaft 36 which is accurately slidably received within a parallel sided radial slot 37 in the disc-like plate member 25. The right-hand end of each of rollers 16 is provided with a central stub shaft 39 which is received within radial slots 40 in the end closure member 26. Because of such manner of mounting of the rollers 16, the radius of engagement with respect to the flanks of the threads on the lead screw 12 and the crests of the threads on the rollers 16 may be varied.

The thread 41 on lead screw 12 is a right-hand thread of the single thread type, the thread profile being of the modified Acme form. The threads 42 and 45 on rollers 15 and 16, respectively, are of the left-hand single thread type, and are each of different V-shaped profiles. As above noted, the crests of the lands of the thread 41 engage the flanks of the thread on each of the rollers 15, the points of engagement between such threads being designated 44. The points of engagement between the crests of the lands of the threads 45 on roller 16 and the flanks of the thread 41 on lead screw 12 is designated 46. In the embodiment shown, mechanism is provided for varying the radius with respect to the rollers 15 of the points of contact 44 between the threads 42 thereon and the thread 41 on lead screw 12 inversely with respect to the radius relative to the lead screw 12 of the points of contact 46 between the thread 41 thereon and the thread 45 on each of the rollers 16.

The mechanism for thus varying such radii of contact includes an annular transverse groove 47 which is provided in each of the rollers 15 generally midway of its length. Entrained within the pulleys formed by grooves 47 is a resilient belt 49 formed of rubber or rubber-like material. Belt 49 constantly resiliently urges each of the rollers 15 radially inwardly toward the axis of the lead screw 12. Each of the rollers 16 is provided with an annular transverse groove 50, such grooves forming pulleys receiving a resilient rubber or rubber-like belt 51 which constantly resiliently urges the rollers 16 radially inwardly toward the axis of the lead screw 12.

Pivotally mounted centrally of its length upon a pivot pin 54 affixed to member 20 is a first class lever 52 which extends generally parallel to the longitudinal axis of the carriage 11. Lever 52 has a vertically open central slot 56 in the upper surface thereof above the pivot pin 54, slot 56 accurately receiving between the upstanding sidewalls thereof a part-cylindrical lower end 55 on the lever 17 below its pivot pin 19. It will be seen that turning of the lever 17 clockwise rotates the lever 52 counterclockwise, and vice versa. Mounted upon the end of the left-hand arm of the lever 52 is a first tensioning roller 57 which overlies the resilient belt 49 centrally of the upper run of the belt. Roller 57 is attached to lever 52 by an axle forming pin 59 which may be threaded into the lever. The end of the right-hand arm of lever 52 is provided with a similar belt tensioning roller 60 which is attached to the end of the right-hand arm of lever 52 by a stub shaft 61, and overlies the central portion of the upper run of the belt 51 as shown in FIG. 2.

The parts are so constructed and arranged that when the carriage 11 is subjected to no endwise thrust or axial load, the rollers 15 and 16 assume the radial positions relative to the lead screw 12 which is shown in FIG. 1. In such positions of the rollers 15 and 16 the radii of engagement of the flank of the thread on roller 15 equals the crest radius of the thread 41 on lead screw 12, and the crest diameter of the thread 45 on the rollers 16 equals the radius with respect to the lead screw of the points of engagement 46. In such position the resilient belt 49 thrusts the rollers 15 radially inwardly with a force which is balanced by the radially outwardly directed vector force which the crests of the lands of the thread 41 on the lead screw exerts upon the flanks of the threads 42 on the differential rollers 15. The same is true of rollers 16, such rollers lying in radial positions wherein the radially inwardly directed thrusts upon them by the resilient belt 51 is balanced by the radially outwardly directed force upon them by reason of the engagement between the crests of the lands of the thread on the rollers 16 with the flanks of the thread 41 on the lead screw 12.

Due to the controlling flank angle, the radially compressive forces derived from the resilient belts have an axial component which, for each system 12, 15 and 12, 16, must be equal by design and which must oppose each other in the overall system in order to maintain equilibrium. Thus neither of the systems composed on the one hand of the lead screw 12 and the rollers 15 and on the other by the lead screw 12 and the rollers 16 has any tendency to move axially in either direction, and so the carriage 11 is at rest.

When the lever 17 is swung to the right, that is, clockwise from the neutral position shown in FIG. 1, the rollers 15 are tightened against the screw 12, whereas the rollers 16 are loosened. Accordingly, the system 12, 15 overpowers the system 12, 16 and the carriage then moves to the right against the smaller force exerted against such travel by the rollers 16. When the lever 17 is swung counterclockwise, the system 12, 16 overpowers the system 12, 15 and the carriage 11 travels to the left in a similar manner.

The second embodiment of linear power amplifier mechanism, which is shown in FIGS. 3 and 4, is generally designated by the reference character 64. Such mechanism includes a carriage 65 which is telescoped about and moves axially along a driven rotatable lead screw 66. The carriage 65 has secured thereto terminal portions 67 of a cable which imposes an axial load upon the carriage. The carriage is maintained from rotation about the screw 66 by means of a guide rod 69 which is mounted parallel to the screw 66, and a guide yoke 70 affixed to the carriage accurately embracing the rod 69.

The carriage 65 has a right-hand end plate 71 (FIG. 3), a left-hand end plate 72 spaced from and parallel to plate 71 and spaced parallel side plates 74 to which the plates 71 and 72 are secured by machine screws 78 (FIG. 4), such plates forming a housing or carriage. The carriage is guided axially along the screw 66 by means of guide bushing 76 which accurately receive the outer surfaces of the lands on the thread of screw 66 and are fixedly mounted in oppositely axially extending central flanges or sleeves 75 which are integral with the respective plates 71 and 72. Slidable vertically in the guideway within the housing formed by the inner surfaces of the plates 71, 72, and 74 is a control block 77. The control block 77 has a lower portion 79 which extends between the inner faces of plates 71 and 72 and upstanding right and left-hand wall portions 80 and 81, respectively, the upper ends of portions 80 and 81 being connected by a portion 82, the left-hand end of portion 82 being thickened at 84.

The control block 77 is moved vertically for short distances with respect to the housing of the carriage by means of a control lever 85 in the form of a bell crank. At the intersection of its two arms, the lever has a passage receiving a pivot pin 86 therethrough, the pivot pin being mounted upon a block 87 which extends across between the opposite side plates 74 of the carriage and is affixed thereto by one or more bolts, of which one is shown at 89. The lower horizontal arm of the bell crank lever 85 has an end 90 of part-cylindrical shape, such end being accurately received within a parallel sided recess 91 in the thickened portion 84 of the control block. It will be apparent that turning of the lever 85 clockwise from the central neutral position shown in FIG. 3 raises the control block relative to the housing of the carriage and that turning of the lever 85 in a counterclockwise direction lowers the control block in the housing.

The control block 77 has a central recess therewithin between the vertical portions 80, 81 and the horizontal portions 79, 82 thereof. Within such recess and journalled between the portions 80 and 81 of the control block are an upper differential roller 92 and a lower differential roller 93, each of such rollers taken with the lead screw 66 constituting a system for converting rotary motion to linear motion. The differential rollers 92 and 93, which are disposed substantially parallel to the lead screw 66, have central stub shafts 94 on the opposite ends thereof, such stub shafts being journalled in bearings 95 in the respective members 80 and 81. It will be seen that as the control block is raised or lowered in the housing of the carriage it carries with it the differential rollers 92 and 93, the axis of one of the rollers moving closer to the axis of the lead screw 66 while the axis of the other roller moves away therefrom, and vice versa.

The thread 97 on lead screw 66 is of the modified Acme form, the threads 96 and 98 on rollers 93 and 92, respectively, being V-shaped in profile. Driving engagement between the thread 97 on lead screw 66 and the thread 98 on differential roller 92 takes place between the flanks of the threads 97 and the crests of the threads 98. Driving engagement between the threads on the differential roller 93 and the lead screw takes place by way of engagement between the crests of the thread 97 and the flanks of the thread 96. It will be seen that as the control block 77 is raised, the crests of the thread 98 on roller 92 engage the flanks of the thread 97 further from the axis of the lead screw 66 while engagement between the crests of threads 97 and the thread 96 on roller 93 takes place closer to the axis of the roller 93. This combined action effectively speeds the relative rotation of both differential rollers, causing translation to the right.

The action of the two systems, which act in opposition to each other, is thus generally similar to that of the above described embodiment of FIGS. 1 and 2. Not only is the second embodiment of apparatus more compact than that of the first, but such second embodiment incorporates means whereby the two differential rollers 92 and 93 are maintained in synchronism at all times. Such synchronizing means takes the form of a pinion 100 fixedly connected to the left-hand end of each of rollers 92 and 93, and a ring gear 101 provided with internal teeth which are in constant mesh with the pinions 100. The ring gear is rotatably mounted between three angularly spaced small rollers 104 which are fixedly secured to the control block 77 by short axles or pintle pins 105. The rollers 104 are grooved as shown to receive the outer smooth peripheral and end surfaces of the ring gear 101 therein. It will be seen that as the control block 77 is vertically adjusted, the rollers 92 and 93, and the pinions 100 and the ring gear 101 move with it.

In the embodiment of FIGS. 3 and 4 as the control block 77 is moved relative to the lead screw 66, there are equal changes in the radii of contact between the thread on the screw and the threads on rollers 92 and 93. Because the diameter $D_R$ of roller 93 is normally larger than the diameter $D_R$ of roller 92, this equal change represents a larger proportional (percentage) change for roller 92 than for roller 93. Therefore the rotational speed of the two rollers would not be exactly the same if the phasing system (the gears 100 and 101) were removed. This effect will, with the phasing system, cause slight slippage between the lead screw and the rollers.

Such slippage can be eliminated by making the changes in $D_R$ for the rollers 92 and 93 proportionally equal but unequal in the absolute sense. This can be accomplished by moving the longitudinal axis of the smaller differential roller 92 off the vertical center line of the device, that is, to the right or left of the position thereof shown in FIG. 3. By so changing the system, the change in the diameter $D_R$ of the smaller differential roller 92 will be less than that of roller 93, which still lies on the center line of the device; the degree of shifting of roller 92 from the center line of the device can be made such that the proportional change in the value $D_R$ for rollers 92 and 93, upon movement of the control block 77, will be equal.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although the differential rollers have been shown as being of the single thread type, it is to be understood that, if desired, they may have multiple threads.

I claim:

1. A mechanism for converting rotary to linear motion comprising a driven rotatable threaded lead screw, a carriage mounted to be driven along the lead screw upon rotation of the latter, two sets each comprising at least one threaded differential roller journalled on the carriage for linear travel with the carriage, the threads of the rollers of each set thereof meshing with the thread of the lead screw, each set of rollers taken with the lead screw constituting a system for converting the rotary motion of the lead screw to linear motion of the carriage, the two systems being disposed to exert opposing linear forces upon the carriage, and means for varying the effective ratio of rotary to linear motion of at least one system, whereby to vary the ratio of the speed of linear travel of the carriage to the speed of rotation of the screw.

2. A mechanism as claimed in claim 1, wherein the means for varying the effective ratio of rotary to linear motion of at least one system also selectively varies the direction of the linear travel of the carriage to the direction of rotation of the screw.

3. A mechanism as claimed in claim 1, wherein the means for varying the effective ratio of the speed of linear travel of the carriage to the speed of rotation of the screw comprises means for varying the effective ratio of rotary to linear motion of the two systems inversely.

4. A mechanism as claimed in claim 3, comprising means for varying the contact diameters of the rollers of the set and the lead screw of each system.

5. A mechanism as claimed in claim 3, comprising a single control means on the carriage connected to both systems so as to vary their rotary-linear speed ratios inversely.

6. A mechanism as claimed in claim 3, wherein the rollers of the two systems are disposed serially upon the lead screw, the rollers and the lead screw have crest to flank engagement, and the means for varying the effective ratio of rotary to linear motion of the two systems inversely comprises means for moving the rollers of one system radially toward the axis of the lead screw while moving the rollers of the other system radially outwardly from the axis of the lead screw, and vice versa.

7. A mechanism as claimed in claim 6, comprising separate means constantly resiliently urging the rollers of each system radially inwardly toward the axis of the lead screw against the radially outwardly directed thrust imposed on the rollers by the lead screw when the carriage is opposed in its linear travel.

8. A mechanism as claimed in claim 7, comprising means for subjecting the resilient means of one system to increased tension while subjecting the resilient means of the other system to decreased tension, and vice versa.

9. A mechanism as claimed in claim 8, wherein each of the means constantly resiliently urging the rollers of each system radially inwardly toward the axis of the lead screw comprises a resilient belt encircling and drivingly engaging the rollers of its respective system, and comprising a first class rock lever pivoted on the carriage, and a belt tensioning roller journalled on the end of each arm of the lever and engaging the respective belt so as variably to tension such belt.

10. A mechanism as claimed in claim 3, wherein the rollers of the two systems are disposed at the same longitudinal zone and on opposite sides of the lead screw, the rollers and the lead screw have crest to flank engagement, and the means for varying the effective ratio of rotary to linear motion of the two systems inversely comprises means for moving the rollers of one system toward the axis of the lead screw while moving the rollers of the other system away from the axis of the lead screw, and vice versa.

11. A mechanism as claimed in claim 10, comprising a control block mounted on the carriage for adjustment thereon in a direction transverse to the axis of the lead screw, means on the control block journalling the rollers, and means for adjusting the position of the control block on the carriage laterally of the lead screw.

12. A mechanism as claimed in claim 11, comprising means for drivingly connecting the rollers for synchronous rotation.

13. A mechanism as claimed in claim 12, wherein the means for drivingly connecting the rollers for synchronous rotation comprises an internal ring gear journalled on the control block for movement therewith, and gears fast to the rollers and meshing with the internal ring gear.

14. A mechanism as claimed in claim 13, comprising a lever pivoted on the carriage to swing in a longitudinal plane containing the axis of the lead screw, and means connecting the level to the control block, the parts being so constructed and arranged that when the lever is in a mid position the carriage is at rest and that swinging of the lever in the respective opposite directions from said mid position causes the carriage to move along the lead screw in the direction in which the lever is swung.

References Cited

UNITED STATES PATENTS

| 2,473,566 | 6/1949 | Brassell | 74—424.8 |
| 2,477,701 | 8/1949 | McCallum | 74—424.8 |
| 2,556,572 | 6/1951 | Brinkhurst | 74—424.8 |
| 3,295,385 | 1/1967 | Jenny | 74—424.8 |

FOREIGN PATENTS 373,077   5/1932   Great Britain.

FRED C. MATTERN, JR., *Primary Examiner.*

W. S. RATLIFF, JR., *Assistant Examiner.*

U.S. Cl. X.R.

49—360; 74—424.8

U.S. DEPARTMENT OF COMMERCE

PATENT OFFICE

Washington, D.C. 20231

UNITED STATES PATENT OFFICE

CERTIFICATE OF CORRECTION

Patent No. 3,434,357                                                         March 25, 1969

William J. Roantree

It is certified that error appears in the above identified patent and that said Letters Patent are hereby corrected as shown below:

Column 8, line 72, "level" should read -- lever --.

Signed and sealed this 31st day of March 1970.

(SEAL)
Attest:

Edward M. Fletcher, Jr.                                  WILLIAM E. SCHUYLER, JR.
Attesting Officer                                               Commissioner of Patents